(12) United States Patent
Wu et al.

(10) Patent No.: US 9,500,912 B2
(45) Date of Patent: Nov. 22, 2016

(54) LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Ling Wu, Xiamen (CN); Boping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 30 days.

(21) Appl. No.: 14/690,506

(22) Filed: Apr. 20, 2015

(65) Prior Publication Data
US 2016/0161788 A1 Jun. 9, 2016

(30) Foreign Application Priority Data
Dec. 4, 2014 (CN) .......................... 2014 1 0733413

(51) Int. Cl.
| | |
|---|---|
| *H04N 13/04* | (2006.01) |
| *G02B 27/22* | (2006.01) |
| *G02F 1/1339* | (2006.01) |
| *G02F 1/1333* | (2006.01) |
| *G02F 1/1335* | (2006.01) |
| *G02F 1/1337* | (2006.01) |
| *G02F 1/1343* | (2006.01) |
| *G02F 1/1362* | (2006.01) |
| *G02F 1/1368* | (2006.01) |

(52) U.S. Cl.
CPC ......... *G02F 1/13394* (2013.01); *G02F 1/1368* (2013.01); *G02F 1/133345* (2013.01); *G02F 1/133512* (2013.01); *G02F 1/133516* (2013.01); *G02F 1/133784* (2013.01); *G02F 1/134363* (2013.01); *G02F 1/136227* (2013.01); *G02F 2001/13398* (2013.01)

(58) Field of Classification Search
CPC ............. G02F 1/13394; G02F 1/1368; G02F 1/133345; G02F 1/133512; G02F 1/133516; G02F 1/136227; G02F 1/133784; G02F 1/134363; G02F 2001/13398
See application file for complete search history.

(56) References Cited

FOREIGN PATENT DOCUMENTS

TW          I253530 B        4/2006

*Primary Examiner* — Tracie Y Green
(74) *Attorney, Agent, or Firm* — Faegre Baker Daniels LLP

(57) ABSTRACT

A liquid crystal display panel, including first and second pixels adjacently disposed in an extending direction of a gate line, where pixel electrodes in the first and second pixels are respectively connected with switch elements through first and second through holes. The liquid crystal display panel is further provided with a plurality of spacers configured to maintain thickness of the liquid crystal display panel; and a black matrix disposed along the extending direction of the gate line; where the spacers are disposed corresponding to the black matrix and the spacer has a first width in a direction parallel to an extending direction of the black matrix and a second width in a direction vertical to the extending direction of the black matrix, the second width is less than the first width which is no less than a distance between the first through hole and the second through hole.

19 Claims, 6 Drawing Sheets

LIQUID CRYSTAL DISPLAY PANEL

CROSS-REFERENCE TO RELATED APPLICATION

This application claims priority to Chinese Patent Application No. 201410733413.0, filed on Dec. 4, 2014, the disclosure of which is incorporated herein by reference in its entirety.

TECHNICAL FIELD

The present disclosure relates to a liquid crystal display panel, in particular to spacers for maintaining thickness of a liquid crystal display panel.

BACKGROUND

Liquid crystal display devices, which have advantages such as non-radiation, light weight, thin thickness and being power-efficient, have been widely used in various electronic products for information, communication and consumption. A liquid crystal display device generally includes a liquid crystal display panel, which includes a pair of substrates disposed opposite to each other and a liquid crystal layer disposed between the pair of substrates. Moreover, in the liquid crystal display panel, thickness of the liquid crystal layer, i.e. a unit thickness, is maintained constant by spacers disposed between the pair of substrates. Typically, spacers in bead shapes diffusedly disposed between the pair of substrates are used. In recent years, however, to improve uniformity of the unit thickness, columnar photosensitive spacers formed and disposed by photo-etching are used between the pair of substrates rather than using the spacers in bead shapes.

FIG. 1 is a plane view of an existing active matrix substrate 110. FIG. 2 is a sectional view of the active matrix substrate 110 and a liquid crystal display panel 100 including the same taken along a line V-V in FIG. 1.

As shown in FIGS. 1 and 2, the liquid crystal display panel 100 includes the active matrix substrate 110, a color filter substrate 120 and a liquid crystal layer 130 between the active matrix substrate 110 and the color filter substrate 120. Photosensitive spacers 123 are provided in the liquid crystal layer 130 to maintain thickness of the liquid crystal display panel 100, and an alignment layer 125 contacting with the liquid crystal layer 130 is disposed on a surface of the color filter substrate 120.

The active matrix substrate 110 includes: a plurality of pixel electrodes 117; a plurality of gate lines 113 extending in parallel to each other along short edges of the respective pixel electrodes 117; a plurality of data lines 115 extending in parallel to each other along long edges of the respective pixel electrodes 117; and a plurality of thin film transistors (TFTs) 105 which are respectively arranged at intersecting portions between the respective gate lines 113 and the respective data lines 115 and respectively connected with the pixel electrodes 117. Moreover, in each pixel regarded as the minimal unit of an image, a TFT 105 is connected with a pixel electrode 117 via a through hole 106 formed at a resin film 101 on the TFT 105. In FIG. 1, the photosensitive spacer 123 is located near an intersecting portion between the gate line 113 and the data line 115, and is formed on the color filter substrate 120 so as to butt against a surface of the active matrix substrate 110 to maintain the unit thickness when a surface of the liquid crystal display panel is pressed.

As mentioned above, in the event that the photosensitive spacers 123 are formed between substrates opposite to each other, problems may be caused in that: an offset may occur when sticking the active matrix substrate 110 and the color filter substrate 120, thus a head portion of the photosensitive spacer 123 on the color filter substrate 120 falls into the interior of the concave through hole 106 formed in the active matrix substrate 110. Therefore, the unit thickness of an area in which the head portion of the photosensitive spacer 123 falls into the interior of the through hole 106 becomes less rather than being maintained constant, so that a stable unit thickness control can hardly be achieved by the photosensitive spacer 123.

In addition, as precision of pixels in the liquid crystal display panel increases, intervals between various data lines 115 become narrower, therefore the photosensitive spacer 123 or the through hole 106 is formed protruding to a light transmission region in a plane view, so as to widen a distance between the through hole 106 and the photosensitive spacer 123 in the plane view. As shown in FIG. 1, the light transmission region here refers to an area, which is not overlapped with the TFT 105, in an area surrounded by a pair of adjacent gate lines 113 and a pair of adjacent data lines 115, and is an area through which light from a backlight source for example may be transmitted so as to be effective for image displaying. When the photosensitive spacer 123 or the through hole 106 protrudes to the light transmission region in the plane view, a portion of the photosensitive spacer 123 or the through hole 106 that protrudes to the light transmission region will eliminate part of the light transmission region, so that the area of an image displaying region is reduced, thus reducing an aperture ratio of the pixel. For example, in the event that the photosensitive spacer 123 is formed protruding to the light transmission region, orientation of the liquid crystal layer near the photosensitive spacer 123 tends to be disordered, so that an area near the photosensitive spacer 123 is obstructed, thus reducing the aperture ratio of the pixel. Moreover, in the event that the through hole 106 is formed protruding to the light transmission region, orientation of the liquid crystal layer near the through hole 106 tends to be disordered, thus reducing the aperture ratio of the pixel due to the same situation mentioned above. Furthermore, light leakage occurs at the area, in which orientation of the liquid crystal layer is disordered, near the photosensitive spacer 123 and the through hole 106, thereby leading to decline of contrast as well. Thus, in the existing liquid crystal display panel, stability of unit thickness control can hardly be maintained through arrangement of the through hole and the photosensitive spacer, and the aperture ratio of a pixel can hardly be maintained.

Further, as precision of pixels in the liquid crystal display panel increases, intervals between various data lines 115 become less, and a non-transmission region between adjacent light transmission regions (i.e. an area covered by a black matrix 121) becomes narrower as well, therefore the photosensitive spacer 123 tends to be deflected to the light transmission region while rubbing-aligning the alignment layer 125, resulting in an increase of area of light leakage in the light transmission region due to the photosensitive spacer 123, and further resulting in a decline of contrast.

SUMMARY

The present disclosure is accomplished in view of the above problems and aims to provide a liquid crystal display panel, in which stability of unit thickness control by photosensitive spacers is ensured and a decrease of the aperture ratio of a pixel is eliminated.

The disclosure provides a liquid crystal display panel capable of avoiding a display effect influenced by spacers.

The disclosure provides a liquid crystal display panel, including a first substrate and a second substrate; scanning lines and data lines, wherein the scanning lines intersect the data lines on the first substrate to define a plurality of pixels; a plurality of switch elements; an insulating film disposed in a manner of covering the plurality of switch elements; a plurality of pixel electrodes disposed on the insulating film and connected with the switch elements via a plurality of through holes formed in the insulating film; where the plurality of pixels include a first pixel and a second pixel adjacently disposed along an extending direction of the scanning line, and the plurality of through holes include a first through hole located in the first pixel and a second through hole located in the second pixel; the liquid crystal display panel further comprises: a black matrix located on the second substrate and disposed along the extending direction of the scanning line; a liquid crystal layer located between the first substrate and the second substrate; and spacers located in the liquid crystal layer and configured to maintain thickness of the liquid crystal layer; where the spacers are disposed corresponding to the black matrix, and the spacer has a first width in a direction parallel to an extending direction of the black matrix and a second width in a direction vertical to the extending direction of the black matrix, the second width is less than the first width, and the first width is no less than a distance between the first through hole and the second through hole.

In embodiments of the disclosure, the first substrate is provided with a common electrode configured to form a parallel electric field with the pixel electrode; the spacer is formed on the second substrate; and the second substrate is provided with an alignment layer having a rubbing direction parallel to the extending direction of the black matrix.

In embodiments of the disclosure, one of the pixel electrode and the common electrode, which is close to the liquid crystal layer, is provided with a slot, and an angle unequal to 90 degrees is formed between an extending direction of the slot and the rubbing direction of the alignment layer.

In embodiments of the disclosure, liquid crystal molecules in the liquid crystal layer are negative liquid crystal molecules.

In embodiments of the disclosure, an angle no less than 75 degrees is formed between the extending direction of the slot and the rubbing direction of the alignment layer.

In embodiments of the disclosure, the angle is of 83 degrees.

In embodiments of the disclosure, the insulating film is a resin film.

In embodiments of the disclosure, the first width of the spacer is not greater than a sum of a width of the first pixel and a width of the second pixel along the extending direction of the scanning line.

In embodiments of the disclosure, the second width of the spacer is less than a width of the black matrix.

In embodiments of the disclosure, a cross-section of the spacer in a plane parallel to the first substrate is oval.

In embodiments of the disclosure, a cross-section of the spacer in a plane parallel to the first substrate has an ellipse-like shape, which is composed of a rectangle and two arcs located at two ends of the rectangle.

In embodiments of the disclosure, an end of the spacer overlaps with an end of the first through hole, and another end of the spacer overlaps with an end of the second through hole.

In embodiments of the disclosure, the plurality of pixels further include a third pixel disposed adjacent to the second pixel along the extending direction of the scanning line; and the plurality of through holes further include a third through hole located in the third pixel.

In embodiments of the disclosure, an end of the spacer overlaps with an end of the first through hole, and another end of the spacer is disposed between the second through hole and the third through hole.

In embodiments of the disclosure, an end of the spacer is disposed between the first through hole and the second through hole, and another end of the spacer is disposed between the second through hole and the third through hole.

In embodiments of the disclosure, a middle part of the spacer overlaps with the second through hole.

In embodiments of the disclosure, an end of the spacer overlaps with an end of the first through hole, and another end of the spacer overlaps with an end of the third through hole.

In embodiments of the disclosure, the spacers include a first spacer and a second spacer formed on the second substrate; an end of the first spacer contacts with the first substrate, and there is a certain distance between an end of the second spacer is spaced from the first substrate by a distance.

The present disclosure further provides a manufacturing method of a liquid crystal display panel, including: forming a second substrate having a black matrix, where the black matrix comprises a plurality of openings filled with a color filter layer; forming an organic material layer on the color filter layer; exposuring to the organic material layer using a photo mask including a light transmitting part and a light barrier part, wherein the light transmitting part has a first width and a second width; and developing the exposed organic material layer to form a spacer.

Compared with the related art, a spacer of the liquid crystal display panel of the present disclosure is disposed at a location for covering a black matrix of a gate line, and length of the spacer along an extending direction of the black matrix is greater than that of the spacer vertical to the extending direction of the black matrix, therefore the spacer would not tend to be deflected to a light transmission region during a rubbing-aligning processing, thus reducing light leakage and reducing effect of the spacer to contrast of the liquid crystal display panel; meanwhile, length between two ends of the spacer is no less than a distance between adjacent through holes so that an end of the spacer would not fall into the through hole, therefore thickness of the liquid crystal display panel may be maintained constant, and uniformity and stability of thickness of the liquid crystal display panel is improved.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
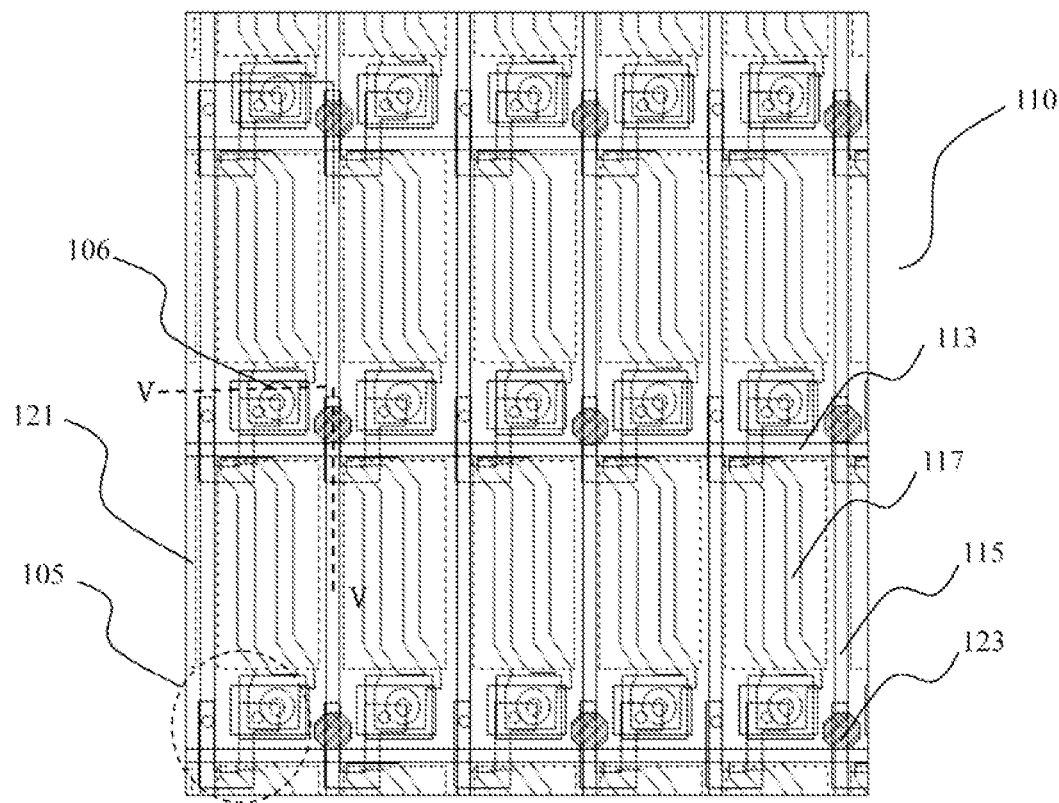
FIG. 1 is a plane view of an active matrix substrate of a liquid crystal display panel in the related art.
Figure 2:
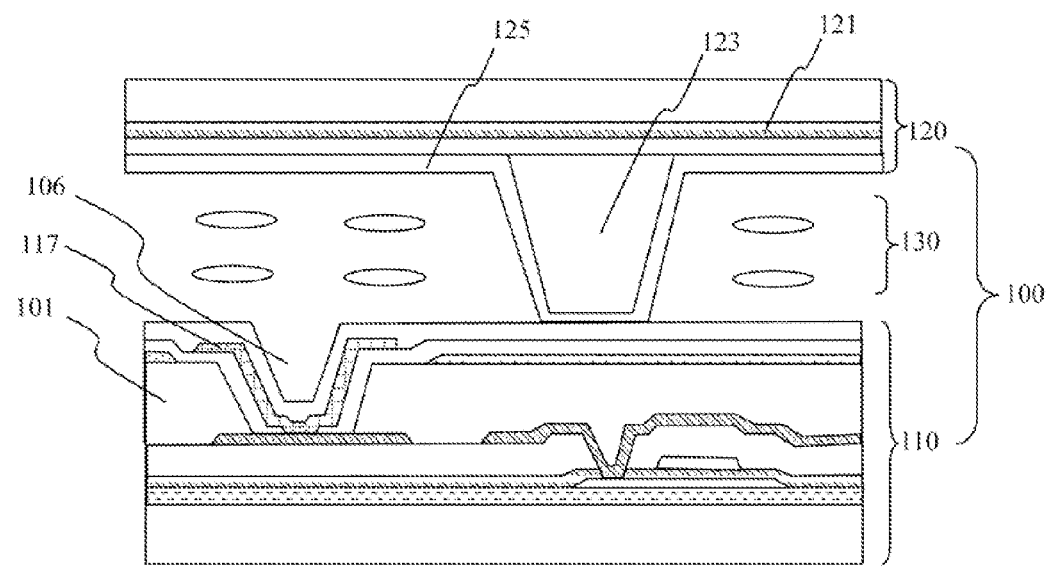
FIG. 2 is a sectional view of the active matrix substrate and a liquid crystal display panel including the same taken along a line V-V in FIG. 1.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the appended claims.

DETAILED DESCRIPTION

Embodiments of the present disclosure are described in detail below with reference to accompanying drawings. In addition, the disclosure is not limited to the disclosed embodiments.

Figure 3:
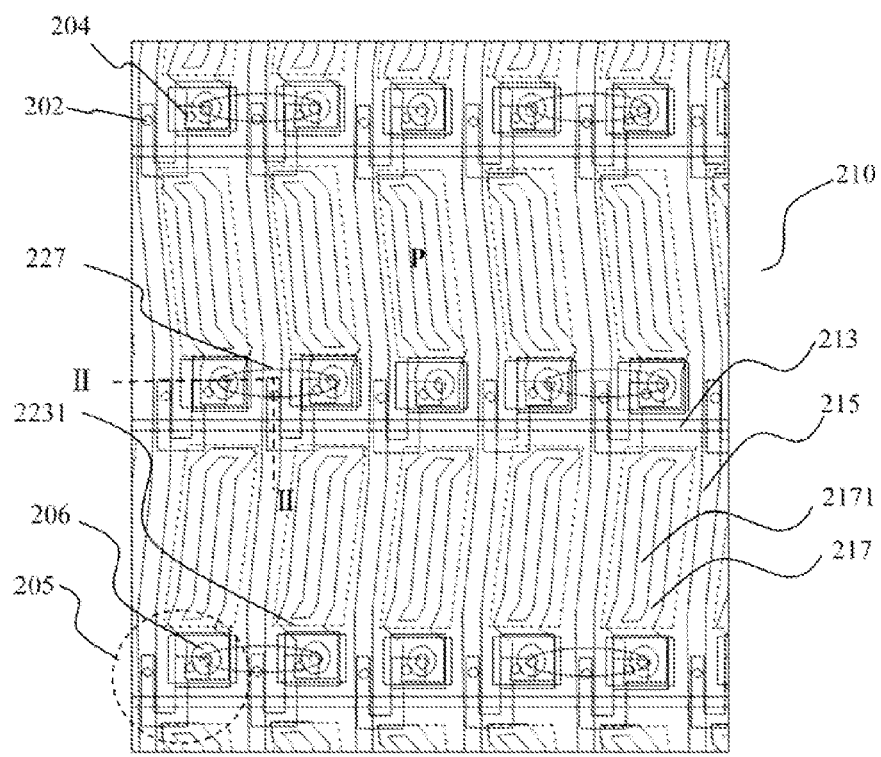
FIG. 3 is a plane view of an active matrix substrate of a liquid crystal display panel, according to embodiments of the disclosure.
Figure 4:
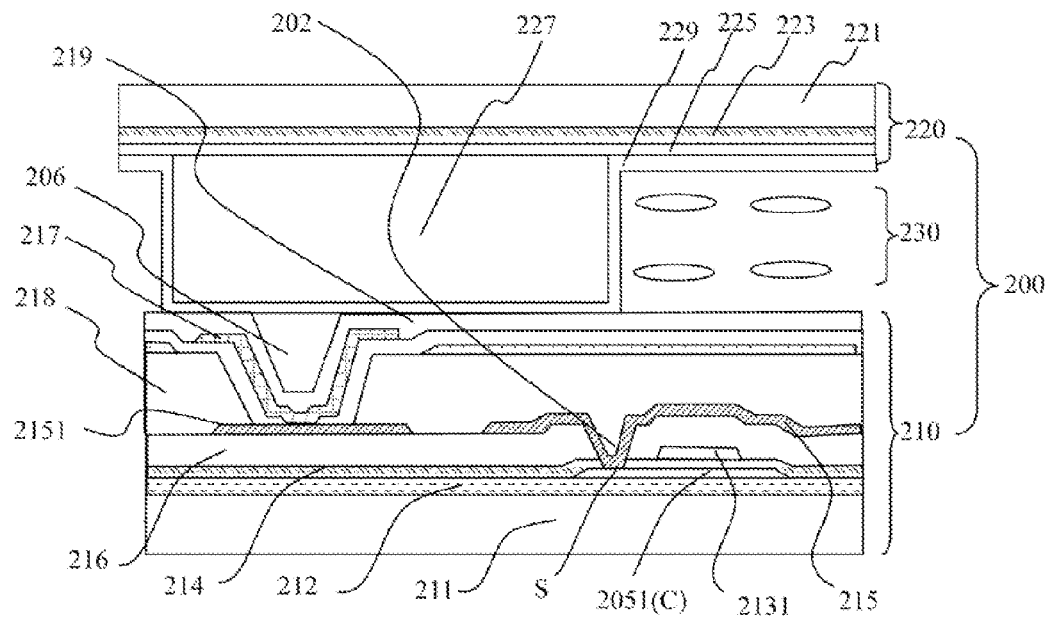
FIG. 4 is a sectional view of the active matrix substrate and a liquid crystal display panel including the same taken along a line II-II in FIG. 3.
Figure 5:
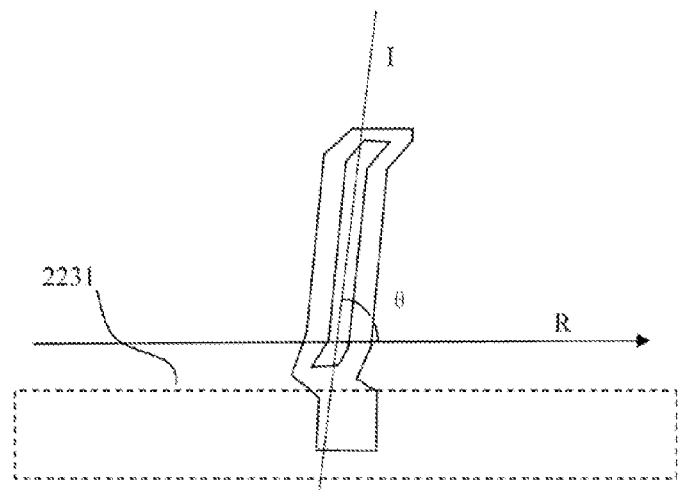
FIG. 5 is a schematic diagram showing a relationship between an extension direction of a slot of a pixel electrode and a rubbing direction of an alignment layer, according to embodiments of the disclosure.
Figure 6:
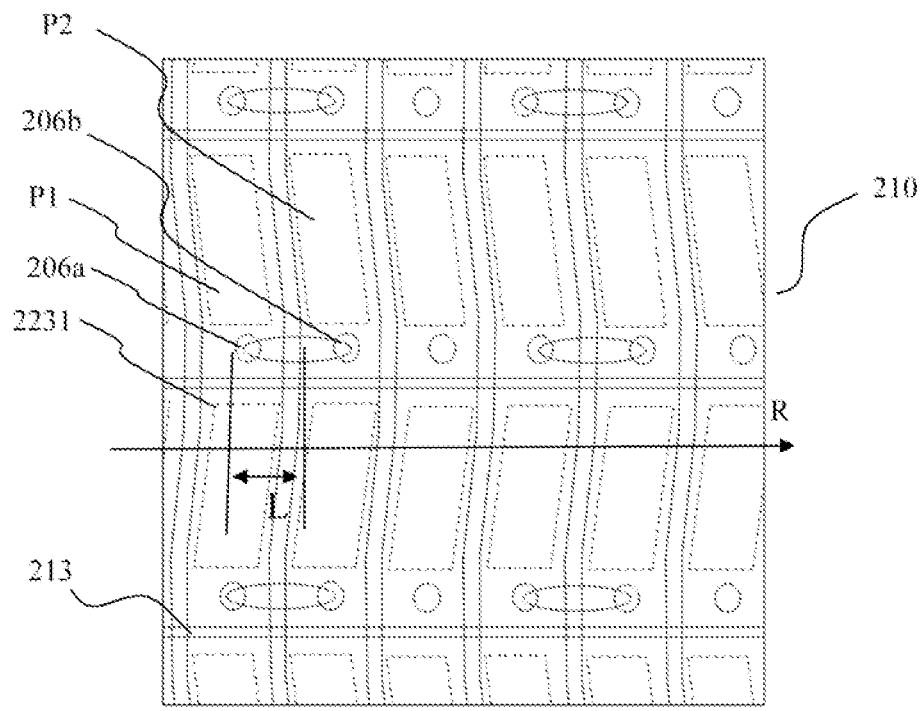
FIG. 6 is a schematic plane view showing the active matrix substrate of the liquid crystal display panel, according to embodiments of the disclosure.
Figure 7:
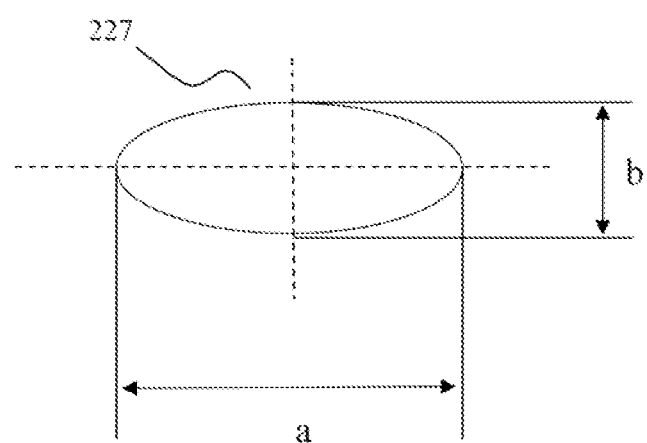
FIG. 7 is a schematic view showing a cross section of the spacer in a plane parallel to a substrate plane of the active matrix substrate, according to embodiments of the disclosure.

FIGS. 3 to 7 are schematic diagrams showing a liquid crystal display panel, according to embodiments of the disclosure. FIG. 3 is a plane view of an active matrix substrate 210 of a liquid crystal display panel 200, according to embodiments of the disclosure, FIG. 4 is a sectional view of the active matrix substrate 210 and a liquid crystal display panel 200 including the same taken along a line II-II in FIG. 3, according to embodiments of the disclosure, FIG. 5 is a schematic diagram showing a relationship between an extension direction of a slot of a pixel electrode and a rubbing direction of an alignment layer, according to embodiments of the disclosure, FIG. 6 is a schematic plane view showing the active matrix substrate 210 of the liquid crystal display panel 200, according to embodiments of the disclosure, and FIG. 7 is a schematic view showing a cross section of the spacer in a plane parallel to a substrate plane of the active matrix substrate 210, according to embodiments of the disclosure.

As shown in FIG. 4, the liquid crystal display panel 200 includes: an active matrix substrate 210 and a color filter substrate 220 disposed opposite to each other; a liquid crystal layer 230 disposed between the active matrix substrate 210 and the color filter substrate 220; and a seal (not shown in FIG. 4) for adhering the active matrix substrate 210 and the color filter substrate 220 together and sealing the liquid crystal layer 230 between the active matrix substrate 210 and the color filter substrate 220.

As shown in FIGS. 3 and 4, the active matrix substrate 210 includes: a first transparent substrate 211 manufactured with transparent material such as glass; a buffer layer 212 disposed on the first transparent substrate 211, where a substantially U-shaped semiconductor layer 2051 is disposed on the buffer layer 212; a gate insulating film 214 disposed in a manner of covering the semiconductor layer 2051; a plurality of gate lines 213 disposed on the gate insulating film 214 in a manner of extending in parallel to each other; and an interlayer insulating film 216 disposed in a manner of covering the gate line 213.

The active matrix substrate 210 further includes: a plurality of data lines 215 disposed on the interlayer insulating film 216 in a manner of extending in parallel to each other in a direction orthogonal to each gate line 213, a plurality of island-shaped drain connecting electrodes 2151 disposed on the interlayer insulating film 216 between data lines 215, a resin film 218 disposed in a manner of covering each data line 215 and each drain connecting electrode 2151, a plurality of pixel electrodes 217 disposed in a matrix on the resin film 218, and an alignment film 219 disposed in a manner of covering each pixel electrode 217.

In addition, in the active matrix substrate 210 as shown in FIG. 3, TFTs 205 are respectively disposed as switch elements at intersecting portions between the gate lines 213 and the data lines 215. As shown in FIG. 3, the TFT 205 includes: a gate electrode part 2131 constituted by a part of the gate line 213, where the gate electrode part 2131 overlaps with two edge parts of the U-shaped semiconductor layer 2051; the semiconductor layer 2051, which includes a channel region C defined in a manner of overlapping with the gate electrode part 2131, and includes a high concentration doped region defined at two sides of the channel region C and including a source region S and a drain region (not shown in FIG. 3); and a gate insulating film 214 disposed between the gate electrode part 2131 and the semiconductor layer 2051.

As shown in FIG. 4, the source region S is connected with a data line 215 via an active contacting hole 202 formed in a stacked film consisting of the gate insulating film 214 and the interlayer insulating film 216. Moreover, the drain region is connected with the drain connecting electrode 2151 via an active contacting hole 204 formed in the stacked film consisting of the gate insulating film 214 and the interlayer insulating film 216. Further, the drain connecting electrode 2151 is connected with the pixel electrode 217 via a through hole 206 formed at the resin film 218.

As shown in FIG. 4, the color filter substrate 220 includes: a second transparent substrate 221 manufactured by transparent material such as glass; a grid-shaped black matrix 223 disposed on the second transparent substrate 221; a color filter layer (not shown in FIG. 4) including colored layers such as red layer, green layer and blue layer disposed between various grids of the black matrix 223; a planarization layer 225 covering the black matrix 223 and the color filter layer; a spacer 227 disposed on the planarization layer 225 at a location of the black matrix 223; and an alignment film 229 disposed in a manner of covering the planarization layer 225 and the spacer 227. An end of the spacer 227 butts against a surface of the active matrix substrate 210 to maintain thickness of the liquid crystal layer 230, i.e. the unit thickness.

Further, as shown in FIGS. 3 and 5, the liquid crystal display panel 200 includes a plurality of pixels P forming the minimal units of an image and respectively corresponding to the pixel electrodes 217, where each pixel P includes the through hole 206 formed in the active matrix substrate 210, and the spacer 227 formed on the color filter substrate 220.

An area of each pixel P, which is not overlapped with the TFT 205, constitutes an area effective for image displaying (i.e. light transmission region), through which light from a backlight source for example may be passed. A non-transmission region (i.e. a portion other than the light transmission region) is covered by the black matrix 223 located on color filter parts, where the black matrix 223 includes a transverse portion 2231 disposed along an extending direction of the gate line 213, and the transverse portion 2231 covers the gate line 213 and the TFT 205.

For the sake of describing a location on the active matrix substrate 210 that corresponds to the spacer 227, a simplified schematic plane view showing the active matrix substrate 210 is shown in FIG. 6. As shown in FIG. 6, the active matrix substrate 210 includes a first pixel P1 and a second pixel P2 adjacently disposed along an extending direction of a scanning line 213, where a through hole in the first pixel P1 is defined as a first through hole 206a, and a through hole in the second pixel P2 is defined as a second through hole 206b. A spacer 227 is disposed at a transverse portion 2231 of the black matrix 223 covering the first through hole 206a, the second through hole 206b and a neighboring gate line 213, and is covered by the transverse portion 2231. As shown in FIG. 7, the spacer 227 has a long axis parallel to an extending direction of the transverse portion 2231 and a short axis vertical to the extending direction of the transverse portion 2231, and has a first width a along the long axis and a second width b less than the first width a along the short axis. The spacer 227 is disposed in such a way that: an end of the spacer 227 facing the first pixel P1 overlaps with an end of the first through hole 206a, an end of the spacer 227 facing the second pixel P2 overlaps with an end of the second through hole 206b, and the first width a of the spacer 227 is no less than a distance L between adjacent ends of the first through hole 206a and the second through hole 206b.

Further, as shown in FIGS. 3, 4 and 5, the active matrix substrate 210 further includes a common electrode (not shown) disposed at a side of the pixel electrode 217 away from the liquid crystal layer 230. The pixel electrode 217 of each pixel electrode P is provided with a slot 2171, and a parallel electric field parallel to a substrate plane of the liquid crystal display panel 200 may be formed between the common electrode and the pixel electrode 217. The alignment film 229 on the color filter substrate 220 has a rubbing direction R for enabling an initial orientation of liquid crystal molecules in the liquid crystal layer 230. In some embodiments, the rubbing direction R is defined to be parallel to the extending direction of the gate line 213, i.e. parallel to the extending direction of the transverse portion 2231 of the black matrix 223; moreover, an extending direction I of the slot 2171 of the pixel electrode 217 is not vertical to the rubbing direction R of the alignment film 229, i.e. an angle θ between the extending direction I of the slot 2171 and the rubbing direction R of the alignment film 229 is unequal to 90 degrees.

In some embodiments, the active matrix substrate 210 further includes a common electrode (not shown in the Figures) disposed at a side of the pixel electrode 217 facing the liquid crystal layer 230, and the slot 2171 may also be formed in the common electrode, which is not specifically limited here.

Further, in some embodiments, liquid crystal molecules in the liquid crystal layer 230 are negative liquid crystal molecules, and the angle θ between the extending direction I of the slot 2171 and the rubbing direction R of the alignment film 229 is equal to 83 degrees. In some embodiments, the liquid crystal molecules in the liquid crystal layer 230 are negative liquid crystal molecules, and the angle θ between the extending direction I of the slot 2171 and the rubbing direction R of the alignment film 229 is no less than 75 degrees, which is not specifically limited here.

Thus, the spacer 227, which is in an elongated shape, may be disposed at the black matrix 223, and a direction of a long axis of the spacer 227 is parallel to the extending direction of the transverse portion 2231 of the black matrix 223, i.e. parallel to the rubbing direction R of the alignment film 229, so that the rubbing direction R of the alignment film 229 complies with the direction of the long axis of the spacer 227 while aligning the alignment film 229 through rubbing, so as to reduce a risk that the spacer 227 is deflected to the light transmission region of the pixel P due to aligning the alignment film 229 through rubbing, reduces light leakage and improve display contrast of the liquid crystal display panel 200. Meanwhile, since the first width a of the spacer 227 is relatively long and is no less than the distance L between adjacent ends of the first through hole 206a and the second through hole 206b, falling or partially falling of an end of the spacer 227 into the interior of the through hole 206 due to the offset caused when sticking the active matrix substrate 210 and the color filter substrate 220 may be avoided, so that the unit thickness of the liquid crystal display panel 200 may be maintained constant, and uniformity and stability of thickness of the liquid crystal display panel 200 may be improved.

Further, in some embodiments, the spacer 227 has an oval cross-section in a plane parallel to the substrate plane of the active matrix substrate 210.

Further, in some embodiments, the spacer 227 is formed on the color filter substrate 220. Depending on the height of the spacer 227 (i.e. a vertical distance from a base of the spacer 227 formed on the color filter substrate 220 to an end of the spacer 227 facing the active matrix substrate 210), there are two types of the spacers 227 including: one type of spacer 227, which has a height equal to thickness of the liquid crystal layer 230, that is, the base of the spacer 227 is located on the color filter substrate 220 and an end of the spacer 227 is in contact with a surface of the active matrix substrate 210; and another type of spacer 227, the base of which is located on the color filter substrate 220, and an end of which is spaced from the surface of the active matrix substrate 210 by a certain distance. The two types of spacers 227 with two different heights coordinate with each other so that uniformity and stability of thickness of the liquid crystal display panel 200 is further improved.

As such, the liquid crystal display panel 200 with the above structure is constituted in such a way that: when a specific voltage is applied across the various pixel electrodes 217 and the common electrode (not shown in the Figures) on the active matrix substrate 210, an orienting state of liquid crystal molecules in the liquid crystal layer 230 is changed to adjust transmittance of light passing through the liquid crystal display panel with respect to the various pixels P, to display an image.

Subsequently, a manufacturing method of the liquid crystal display panel 200 is described with an example. The manufacturing method includes an active matrix substrate manufacturing process, a color filter substrate manufacturing process, and a liquid crystal dripping and substrate sticking process.

The active matrix substrate manufacturing process follows.

First referring to FIGS. 3 and 4, after filming of an amorphous silicon film with a plasma Chemical Vapor Deposition (CVD) method, by using a disilane as raw gas for example, on the entire first transparent substrate 211 made of transparent material such as glass, a polycrystalline silicon film is formed by heating the amorphous silicon film with laser radiation for example, then the polycrystalline silicon film is patterned using photo-etching to form the semiconductor layer 2051. In addition, filming of silicon oxide or silicon nitride may also be performed between the first transparent substrate 211 and the semiconductor layer 2051 by the plasma CVD method to form a base coat film, i.e. the buffer layer 212 for protecting the semiconductor layer 2051 against an effect caused by impurity particles on the first transparent substrate 211. Subsequently, after filming of silicon oxide or silicon nitride for example through the plasma CVD method and forming the gate insulating film 214 on the entire substrate on which the semiconductor layer 2051 is formed, phosphorus or boron is doped as impurity in the semiconductor layer 2051 via the gate insulating film 214. Further, filming of a molybdenum film and filming of an aluminum film for example are performed in sequence through a sputtering method on an entire substrate on the gate insulating film 214, then patterning is performed on the molybdenum film and the aluminum film using photo-etching to form the gate line 213. Subsequently, phosphorus or boron is doped in the semiconductor layer 2051 via the gate insulating film 214 using the gate line 213 as a mask, so that the channel region C is formed at a portion overlapping with the gate electrode part 2131 of the gate line 213; further, after forming an island-shaped photoresist (not shown in the Figures) in a manner of covering the gate electrode part 2131, phosphorus or boron is doped in the semiconductor layer 2051 via the photoresist and the gate insulating film 214, then activation processing is performed on the doped phosphorus or boron through a heating process so as to form high concentration doped regions in the source region S and the drain region (not shown in the Figures); subsequently, after filming of silicon nitride, silicon oxide and silicon nitride in sequence through the plasma CVD method to form the interlayer insulating film 216, portions of a stacked film consisting of the gate insulating film 214 and the interlayer insulating film 216, which overlap with the source region S and the drain region (not shown in the Figures), are respectively removed by etching to form the active contacting holes 202 and 204. Moreover, after filming of titanium, aluminum and titanium in sequence for example through the sputtering method on the entire substrate on which the interlayer insulating film 216 including the active contacting holes 202 and 204 is formed, patterning is performed on the titanium, aluminum and titanium films using photo-etching to form the data line 215 and the drain connecting electrode 2151; further, after coating acrylic resin on the entire substrate formed with the data line 215 and the drain connecting electrode 2151 through a spin-coating method for example to form the resin film 218, a portion of the resin film 218 that overlaps with the drain connecting electrode 2151 is removed by etching to form the through hole 206 (206a, 206b). Furthermore, filming of Indium Tin Oxide (ITO) for example is performed through the sputtering method on the entire substrate on which the resin film 218 including the through hole 206 is formed, then patterning is performed on the ITO film using photo-etching to form the pixel electrode 217.

Finally, after coating polyimide resin, through a printing method for example, on the entire substrate on which the pixel electrode 217 is formed, a rubbing processing is performed on the polyimide resin to form the alignment film 219. As such, the active matrix substrate 210 is manufactured as above.

The color filter substrate manufacturing process follows.

First referring to FIG. 4, after filming of photosensitive resist material colored in black for example on the entire second transparent substrate 221 made of transparent material such as glass, patterning is performed on the photosensitive resist film using photo-etching to form the black matrix 223; subsequently, after filming of the photosensitive resist material colored in red, green or blue for example between various grids of the black matrix 223, patterning is performed on the photosensitive resist material colored in red, green or blue using photo-etching to form a colored layer of the selected color (for example a red layer), and then the other colored layers (for example a green layer and a blue layer) are formed through repeatedly performing the same processing for the other two colors to form a color filter layer (not shown in the Figures); subsequently, the planarization layer (overcoat) 225 is formed in a manner of covering the color filter layer and the black matrix 223 so as to improve flatness of the color filter substrate 220.

Subsequently, after coating an organic material layer formed of negative sensitized material such as photosensitive acrylic resin or photoresist through the spin-coating method for example on the entire substrate on which the planarization layer 225 is formed, a photo mask is disposed on the organic material layer and exposure processing is then performed, where the photo mask has a light barrier part, and a light transmitting part corresponding to regions where the spacers 227 are located. A first width of the light transmitting part along an extending direction of the gate line 213 on the active matrix substrate 210 is larger than a second width of the light transmitting part along a direction vertical to the extending direction of the gate line 213. Subsequently, a process such as developing is performed to form the spacer 227.

Finally, after coating polyimide resin through a printing method for example on the entire substrate on which the spacers 227 are formed, a rubbing processing is performed on the polyimide resin to form the alignment film 229.

As such, the color filter substrate 220 is manufactured as above.

The liquid crystal dripping and substrate sticking process follows.

First, a frame shape is formed, on the color filter substrate 220 manufactured by the above color filter substrate manufacturing process, by a dispenser for example using a seal formed of resin or the like which is ultraviolet or heat curable. Subsequently, liquid crystal material is dripped to a region surrounded by the frame-shaped seal on the color filter substrate 220 on which above frame-shaped seal is formed.

Further, after sticking the color filter substrate 220 dripped with the above liquid crystal material and the active matrix substrate 210 manufactured in the above active matrix substrate manufacturing process under a hypobaric pressure condition, a stuck body formed by the sticking is opened to an atmospheric pressure so as to pressurize a surface of the stuck body.

After the seal sandwiched in the above stuck body is subjected to UV radiation, the seal is cured through heating the stuck body.

As such, the liquid crystal display panel 200 is manufactured as above.

As illustrated above, the liquid crystal display panel 200 includes: the first pixel P1 and the second pixel P2 adjacently disposed in an extending direction of a scanning line, and the first width of the spacer 227 along an extending direction of the gate line 213 is no less than a distance between a through hole 206 in the first pixel P1 and a through hole 206 in the second pixel P2. Therefore, an end of the spacer 227 would not fall into interior of the through hole 206 in the active matrix substrate 210 even if an offset occurs when sticking the active matrix substrate 210 and the color filter substrate 220. Moreover, in this case, the end of the spacer 227 butts against the pixel electrode 217 outside the through hole 206 in the active matrix substrate 210 so that a unit thickness can be reliably maintained, therefore stable control of thickness of the liquid crystal display panel 200 can be ensured using the spacer 227.

In addition, both ends of the spacer 227 are disposed in a manner of respectively overlapping two ends of the through holes 206 in two adjacent pixels P, therefore a margin for an offset caused by sticking the substrates or the like is unnecessary, so that a distance between the spacer 227 and the through hole 206 in a plane view can be reduced. As such, protrusion of the spacer 227 or the through hole 206 to the light transmission region in the pixel P can be restrained, therefore a decrease of the aperture ratio of the pixel P can be restrained. The decrease of the aperture ratio of the pixel can be restrained in a high precision liquid crystal display panel in which intervals between adjacent data lines 215 are narrow.

In addition, since the spacer 227, which is in an elongated shape, is disposed at the black matrix 223, and the long axis of the spacer 227 is parallel to the extending direction of the transverse portion 2231 of the black matrix 223, i.e. parallel to the rubbing direction R of the alignment film 229, so that the rubbing direction R of the alignment film 229 complies with the direction of the long axis of the spacer 227 while aligning the alignment film 229 through rubbing, so as to reduce a risk that the spacer 227 is deflected to the light transmission region of the pixel P due to aligning the alignment film 229 through rubbing, reduces light leakage and improves display contrast of the liquid crystal display panel 200. The above improvements are more significant in a high precision liquid crystal display panel in which intervals between adjacent data lines 215 are narrow.

Figure 8:
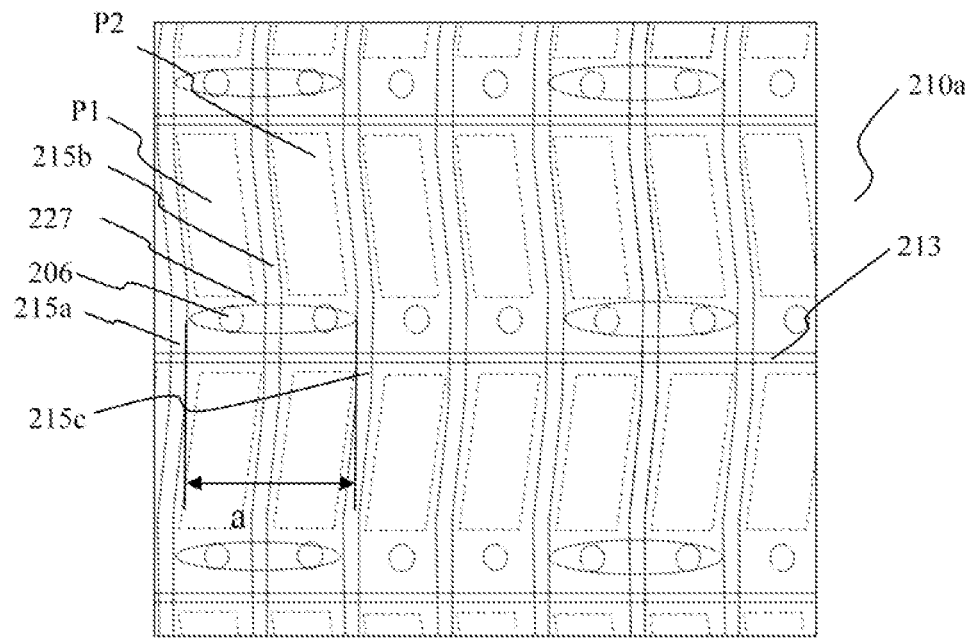
FIG. 8 is a schematic plane view showing an active matrix substrate of a liquid crystal display panel, according to embodiments of the disclosure.

FIG. 8 is a schematic plane view showing an active matrix substrate 210b, according to embodiments of the disclosure. In addition, in the following embodiments, the same reference numerals are used and detailed descriptions thereof are omitted for portions similar to those in FIGS. 3 to 7.

In the liquid crystal display panel, as shown in FIG. 4, each spacer 227 is disposed in a manner of respectively overlapping both ends of the spacer 227 with two ends of the through holes 206 in two adjacent pixels P. However, in the active matrix substrate 210b as shown in FIG. 8, a liquid crystal display panel 200 includes a first pixel P1 and a second pixel P2 defined by adjacent data lines 215a, 215b and 215c and two adjacent gate lines 213. The spacer 227 is disposed in a manner of overlapping both a through hole 206a in the first pixel P1 and a through hole 206b in the second pixel P2, and both ends of the spacer 227 are located between the data line 215a and the data line 215c, i.e. the first width a of the long axis of the spacer 227 is less than a distance between the data line 215a and the data line 215c. Moreover, two adjacent spacers 227 along an extending direction of the gate line 213 are spaced by at least one pixel P, so that an effect of the spacer 227 caused to mobility of liquid crystal molecules in the liquid crystal layer 230 is reduced while the first width a of the spacer 227 along the extending direction of the gate line 213 is further increased to increase uniformity and stability of thickness of a liquid crystal cell.

Similar to embodiments in FIGS. 3 to 7, the liquid crystal display panel of FIG. 8 can also maintain stability of thickness control of the liquid crystal display panel by using the spacers 227, restrain the decrease of the aperture ratio of a pixel and improve contrast of display images of the liquid crystal display panel.

Figure 9:
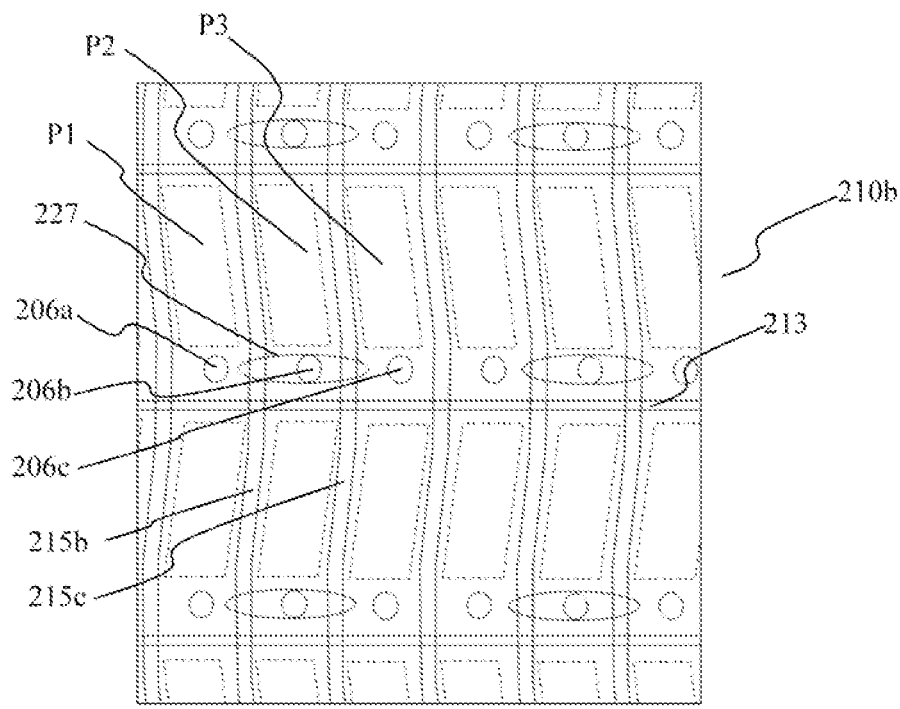
FIG. 9 is a schematic plane view showing an active matrix substrate of a liquid crystal display panel, according to embodiments of the disclosure.

FIG. 9 is a schematic plane view showing an active matrix substrate 210c, according to some embodiments of the disclosure.

A structure of a liquid crystal display panel of FIG. 9, which is similar to that of a liquid crystal display panel of FIGS. 3-7, is different from the structure of the liquid crystal display panel of FIGS. 3-7 in that: as shown in FIG. 9, an active matrix substrate 210b includes a first pixel P1, a second pixel P2 and a third pixel P3 arranged adjacently along an extending direction of the gate line 213, where through holes located in the first pixel P1, the second pixel P2 and the third pixel P3 are respectively defined as a first through hole 206a, a second through hole 206b and a third through hole 206c; the data line 215b is located between the first pixel P1 and the second pixel P2, and the data line 215c is located between the second pixel P2 and the third pixel P3; the spacer 227 is disposed in such a manner that a middle part of the spacer 227 overlaps with the through hole 206b in the second pixel P2, an end of the spacer 227 is disposed between the first through hole 206a and the data line 215b, another end of the spacer 227 is disposed between the second through hole 206b and the data line 215b, and two adjacent spacers 227 along an extending direction of the gate line 213 are spaced by at least one pixel P, so that an effect of the spacer 227 caused to mobility of liquid crystal molecules in the liquid crystal layer 230 is reduced while the first width a of the spacer 227 along the extending direction of the gate line 213 is further increased to increase uniformity and stability of thickness of a liquid crystal cell.

Similar to embodiments of FIGS. 3 to 8, the liquid crystal display panel of FIG. 9 can also maintain stability of thickness control of the liquid crystal display panel by using the spacers 227, restrain the decrease of the aperture ratio of a pixel and improve contrast of display images of the liquid crystal display panel.

Figure 10:
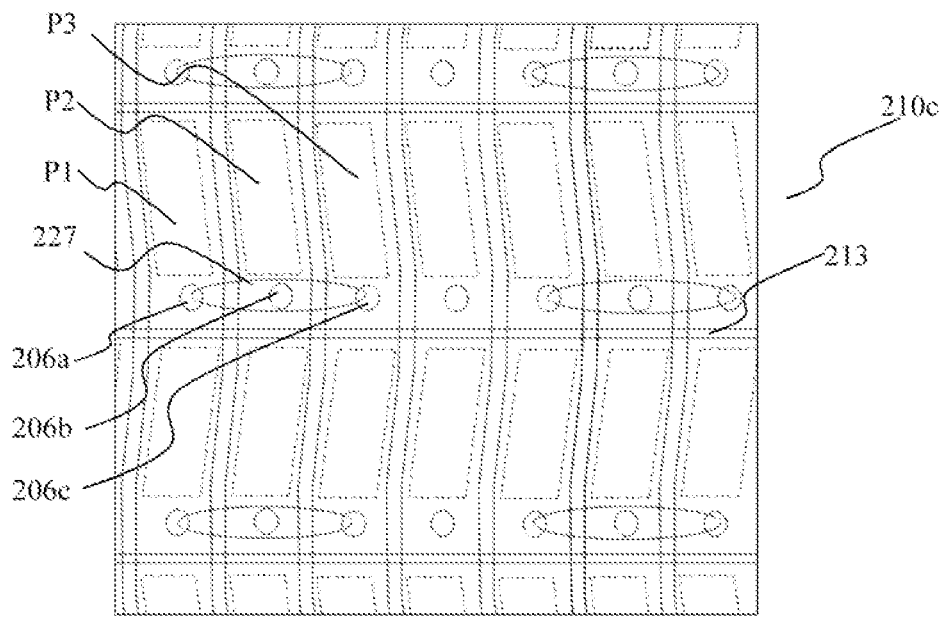
FIG. 10 is a schematic plane view showing an active matrix substrate of a liquid crystal display panel, according to embodiments of the disclosure.

FIG. 10 is a schematic plane view showing an active matrix substrate 210c, according to embodiments of the disclosure.

A structure of a liquid crystal display panel of FIG. 10 is similar to that of a liquid crystal display panel of FIGS. 3-7, but is different from the structure of the liquid crystal display panel of FIGS. 3-7 in that: as shown in FIG. 10, an active matrix substrate 210c includes a first pixel P1, a second pixel P2 and a third pixel P3 arranged adjacently along an extending direction of the gate line 213, where through holes 206 located in the first pixel P1, the second pixel P2 and the third pixel P3 are respectively defined as a first through hole 206a, a second through hole 206b and a third through hole 206c; the spacer 227 is disposed in such a manner that a middle part of the spacer 227 overlaps with the second through hole 206b in the second pixel P2, an end of the spacer 227 along an extending direction of the gate line 213 overlaps with an end of the first through hole 206a, another end of the spacer 227 along the extending direction of the gate line 213 overlaps with an end of the third through hole 206c, and two adjacent spacers 227 along the extending direction of the gate line 213 are spaced by at least one pixel P, so that an effect of the spacer 227 caused to mobility of liquid crystal molecules in the liquid crystal layer 230 is reduced while the first width a of the spacer 227 along the extending direction of the gate line 213 is further increased to increase uniformity and stability of thickness of a liquid crystal.

Similar to embodiments of FIGS. 3 to 9, the liquid crystal display panel of FIG. 10 can also maintain stability of thickness control of the liquid crystal display panel by using the spacer 227, restrain the decrease of the aperture ratio of a pixel and improve contrast of display images of the liquid crystal display panel.

Figure 11:
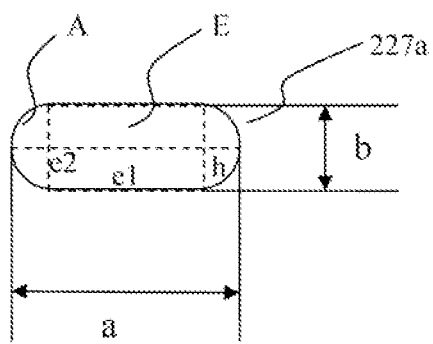
FIG. 11 is a schematic view showing a cross section of the spacer in a plane parallel to a substrate plane of a liquid crystal display panel, according to embodiments of the disclosure.

FIG. 11 is a schematic view showing a cross section of the spacer 227b in a plane parallel to a substrate plane of a liquid crystal display panel, according to embodiments of the disclosure.

A structure of a liquid crystal display panel of FIG. 11 is similar to that of a liquid crystal display panel of FIGS. 3-7, but is different from the structure of the liquid crystal display panel of FIGS. 3-7 in that: as shown in FIG. 11, a cross-section of the spacer 227b in a plane parallel to the substrate plane of the liquid crystal display panel has a ellipse-like shape which is composed of a rectangle E and two arcs A located at two ends of the rectangle E. A first width a of the spacer 227b is equal to a sum of a length of an edge e1 of the rectangle E and heights h of the two arcs A, and a second width b of the spacer 227b is equal to a length of another edge e2 of the rectangle E. Moreover, the first width a is greater than the second width b.

In the above embodiments, the first width of the spacer is no less than a distance between two adjacent through holes, therefore uniformity and stability of thickness control of the liquid crystal display panel can be maintained. Moreover, the spacer, which has an elongated shape, is disposed at the black matrix, thus declining a risk that the spacer is deflected to the light transmission region of the pixel P due to rubbing-alignment, reducing light leakage and improving display contrast of the liquid crystal display panel. Particularly, the above improvements are more significant in a high precision liquid crystal display panel in which intervals between adjacent data lines are narrow.

The liquid crystal display panel and the manufacturing method thereof provided by the present disclosure have been described above in detail, specific examples are given herein to illustrate principles and embodiments of the present disclosure, and above embodiments are merely used for understanding the method and conception of the present disclosure. Meanwhile, various amendments and modifications may be made by those of ordinary skills in the art to the present disclosure without departing from the spirit or scope of the present disclosure. Therefore, the present disclosure is intended to cover amendments and modifications of the present disclosure falling into the scope of attached claims and equivalents thereof.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A liquid crystal display panel, comprising:
a first substrate and a second substrate;
scanning lines and data lines, wherein the scanning lines intersect the data lines on the first substrate to define a plurality of pixels;
a plurality of switch elements;
an insulating film disposed in a manner of covering the plurality of switch elements;
a plurality of pixel electrodes disposed on the insulating film and connected with the switch elements via a plurality of through holes formed in the insulating film;
wherein the plurality of pixels comprise a first pixel and a second pixel adjacently disposed along an extending direction of the scanning line, and the plurality of through holes comprise a first through hole located in the first pixel and a second through hole located in the second pixel;
the liquid crystal display panel further comprising:
a black matrix located on the second substrate and disposed along the extending direction of the scanning line;
a liquid crystal layer located between the first substrate and the second substrate; and
spacers located in the liquid crystal layer and configured to maintain thickness of the liquid crystal layer;
wherein the spacers are disposed corresponding to the black matrix, and the spacer has a first width in a direction parallel to an extending direction of the black matrix and a second width in a direction vertical to the extending direction of the black matrix, the second width is less than the first width, and the first width is no less than a distance between the first through hole and the second through hole.

2. The liquid crystal display panel according to claim 1, wherein the first substrate is further provided with a common electrode configured to form a parallel electric field with the pixel electrode;
the spacer is formed on the second substrate; and
the second substrate is further provided with an alignment layer having a rubbing direction parallel to the extending direction of the black matrix.

3. The liquid crystal display panel according to claim 2, wherein one of the pixel electrode and the common electrode, which is close to the liquid crystal layer, is provided with a slot, and an angle unequal to 90 degrees is formed between an extending direction of the slot and the rubbing direction of the alignment layer.

4. The liquid crystal display panel according to claim 3, wherein liquid crystal molecules in the liquid crystal layer are negative liquid crystal molecules.

5. The liquid crystal display panel according to claim 4, wherein an angle no less than 75 degrees is formed between the extending direction of the slot and the rubbing direction of the alignment layer.

6. The liquid crystal display panel according to claim 4, wherein the angle is of 83 degrees.

7. The liquid crystal display panel according to claim 1, wherein the insulating film is a resin film.

8. The liquid crystal display panel according to claim 1, wherein the first width of the spacer is not greater than a sum of a width of the first pixel and a width of the second pixel along the extending direction of the scanning line.

9. The liquid crystal display panel according to claim 1, wherein the second width of spacer is less than a width of the black matrix.

10. The liquid crystal display panel according to claim 1, wherein a cross-section of the spacer in a plane parallel to the first substrate is oval.

11. The liquid crystal display panel according to claim 1, wherein a cross-section of the spacer in a plane parallel to the first substrate has an ellipse-like shape, which is composed of a rectangle and two arcs located at two ends of the rectangle.

12. The liquid crystal display panel according to claim 1, wherein an end of the spacer overlaps with an end of the first through hole, and another end of the spacer overlaps with an end of the second through hole.

13. The liquid crystal display panel according to claim 1, wherein the plurality of pixels further comprise a third pixel disposed adjacent to the second pixel along the extending direction of the scanning line; and the plurality of through holes further comprise a third through hole located in the third pixel.

14. The liquid crystal display panel according to claim 13, wherein an end of the spacer overlaps with an end of the first through hole, and another end of the spacer is disposed between the second through hole and the third through hole.

15. The liquid crystal display panel according to claim 13, wherein an end of the spacer is disposed between the first through hole and the second through hole, and another end of the spacer is disposed between the second through hole and the third through hole.

16. The liquid crystal display panel according to claim 13, wherein a middle part of the spacer overlaps with the second through hole.

17. The liquid crystal display panel according to claim 16, wherein an end of the spacer overlaps with an end of the first through hole, and another end of the spacer overlaps with an end of the third through hole.

18. The liquid crystal display panel according to claim 1, wherein the spacers comprise a first spacer and a second spacer formed on the second substrate; an end of the first spacer contacts with the first substrate, and an end of the second spacer is spaced from the first substrate by a distance.

19. A manufacturing method of a liquid crystal display panel, comprising:
forming a second substrate having a black matrix, wherein the black matrix comprises a plurality of openings filled with a color filter layer; forming an organic material layer on the color filter layer; exposing the organic material layer using a photo mask comprising a light transmitting part and a light barrier part, wherein the light transmitting part has a first width and a second width; and developing the exposed organic material layer to form a spacer.

* * * * *